United States Patent [19]

Reisch et al.

[11] Patent Number: 5,116,931
[45] Date of Patent: May 26, 1992

[54] THERMOSET POLYURETHANE ELASTOMERS AND POLYUREA ELASTOMERS MADE USING HIGH FUNCTIONALITY, LOW UNSATURATION LEVEL POLYOLS PREPARED WITH DOUBLE METAL CYANIDE CATALYSTS

[75] Inventors: John W. Reisch, Guilford; Deborah M. Capone, Hamden, both of Conn.

[73] Assignee: Olin Corporation, Cheshire, Conn.

[21] Appl. No.: 589,842

[22] Filed: Sep. 28, 1990

[51] Int. Cl.$^5$ .............................................. C08L 75/04
[52] U.S. Cl. ....................................... 528/59; 528/44; 528/76; 528/77; 526/120; 502/169; 428/458
[58] Field of Search ............ 528/44, 59, 76, 77; 526/120; 502/169; 428/458

[56] References Cited

U.S. PATENT DOCUMENTS

| | | | |
|---|---|---|---|
| 3,829,505 | 8/1974 | Herold | 528/76 |
| 3,941,849 | 3/1976 | Herold | 528/92 |
| 4,242,490 | 12/1980 | Emerson et al. | 528/77 |
| 4,335,188 | 6/1982 | Igi et al. | 428/458 |
| 4,472,560 | 9/1984 | Kuyper et al. | 526/120 |
| 4,477,589 | 10/1984 | van der Hulst et al. | 502/169 |
| 4,985,491 | 1/1991 | Reisch | 528/59 |

*Primary Examiner*—John Kight, III.
*Assistant Examiner*—Duc Truong
*Attorney, Agent, or Firm*—Dale L. Carlson

[57] ABSTRACT

This invention relates to a method of fabricating a thermoset elastomer which comprises the steps of: (a) fabricating a polyol having a molecular weight of between about 400 and about 15,000 and having a level of end group unsaturation of not greater than 0.04 milliequivalents per gram of polyol, said polyol being fabricated in the presence of a double metal cyanide catalyst, (b) reacting said polyol with a polyisocynate to produce an isocyanate-terminated prepolymer, and (e) reacting said isocyanate-terminated prepolymer with a chain extender other than ethylene glycol in a mold in order to produce the elastomer. Also claimed is the elastomer produced by the above method utilizing a one-shot technique.

20 Claims, No Drawings

THERMOSET POLYURETHANE ELASTOMERS AND POLYUREA ELASTOMERS MADE USING HIGH FUNCTIONALITY, LOW UNSATURATION LEVEL POLYOLS PREPARED WITH DOUBLE METAL CYANIDE CATALYSTS

FIELD OF THE INVENTION

The present invention relates generally to the production of polyurethane and polyurea elastomers and, more specifically, to the production of polyurethane and polyurea elastomers utilizing high functionality, low unsaturation level polyols prepared by double metal cyanide complex catalysis.

BACKGROUND OF THE INVENTION

The use of double metal cyanide catalysts in the preparation of high molecular weight polyols is well-established in the art. For example, U.S. Pat. No. 3,829,505, assigned to General Tire & Rubber Company, discloses the preparation of high molecular weight diols, triols etc., using these catalysts. The polyols prepared using these catalysts can be fabricated to have a higher molecular weight and a lower amount of end group unsaturation than can be prepared using commonly-used KOH catalysts. The '505 patent discloses that these high molecular weight polyol products are useful in the preparation of nonionic surface active agents, lubricants and coolants, textile sizes, packaging films, as well as in the preparation of solid or flexible polyurethanes by reaction with polyisocyanates.

Certain thermoset polyurethane elastomers produced using triols made by DMC catalysis are also known. More specifically, U.S. Pat. No. 4,242,490 discloses the preparation of such elastomers by reacting a DMC catalyst-prepared polypropylene ether triol having a molecular weight of from 7,000 to 14,000, ethylene glycol, and toluene diisocyanate in a specified range of molar ratios using either a prepolymer process or a "one-shot" process.

Heretofore, the use of high molecular weight polyols made with double metal cyanide catalysts in combination with chain exterders other than ethylene glycol in the preparation of thermoset elastomers, particularly thermoset elastomers characterized by a combination of high tensile strength, good elongation, and high tear strength, has not been known based upon the knowledge of the present inventor. The discovery of such elastomers would be highly desired by the elastomer manufacturing community.

SUMMARY OF THE INVENTION

In one aspect, the present invention relates to a thermoset polyurethane or polyurea elastomer made by reacting an isocyanate-terminated prepolymer with a chain-extender other than ethylene glycol, the isocyanate-terminated prepolymer being the reaction product of a polyisocyanate and a polyether polyol prepared utilizing a double metal cyanide complex catalyst and having a molecular weight of between about 400 and about 15,000 (advantageously between 1,000 and 6,000), said polyol having an end group unsaturation level of no greater than 0.04 milliequivalents per gram of polyol, the equivalent ratio of NCO groups on said polyisocyanate to active hydrogen groups on said polyol plus chain extender being between about 1:0.7 and about 1:1.3, and the molar ratio of chain extender to polyol being between about 0.15:1 and about 1.3:1.

In another aspect, the present invention relates to a thermoset polyurethane or polyurea elastomer made by reacting in a "one-shot" process a polyether polyol, a polyisocyanate, and a chain-extender other than ethylene glycol, the polyether polyol being prepared utilizing a double metal cyanide complex catalyst and having a molecular weight of between about 400 and about 15,000 (advantageously between 1,000 and 6,000), said polyol having an end group unsaturation level of no greater than 0.04 milliequivalents per gram of polyol, the equivalent ratio of NCO groups on said polyisocyanate to active hydrogen groups on said polyol plus chain extender being between about 1:0.7 and about 1:1.3, and the molar ratio of chain extender to polyol being between about 0.15:1 and about 1.3:1.

In yet another aspect, the present invention relates to a method of fabricating a cast elastomer which comprises the steps of:
(a) fabricating a polyol having a molecular weight of between about 2,000 and about 15,000 and having a level of end group unsaturation of no greater than 0.04 milliequivalents per gram of polyol, said polyol being fabricated in the presence of a double metal cyanide catalyst,
(b) reacting said polyol with a polyisocyanate to produce an isocyanate-terminated prepolymer, and
(c) reacting said isocyanate-terminated prepolymer with a chain extender other than ethylene glycol in a mold in order to produce a cast elastomer In still another aspect, the present invention relates to an elastomer as describe above but wherein the chain extender is ethylene glycol and the polyisocyanate is MDI.

These and other aspects will become apparent upon reading the following detailed description of the invention.

DETAILED DESCRIPTION OF THE INVENTION

The polyurethane elastomers of the present invention may be made by the prepolymer process or the one-shot process. The polyurethane isocyanate-terminated prepolymer that is utilized when employing the prepolymer process according to the invention is prepared by reacting an organic polyisocyanate with a polyalkylene ether polyol(s) in an equivalent ratio of NCO to OH groups of from about 1.02/1 to about 15/1, using standard procedures, to Yield an isocyanate-terminated prepolymer of controlled molecular weight. Preferably, the NCO/OH ratio ranges from about 1.3/1 to about 5/1. The reaction may be accelerated by employing a catalyst; common urethane catalysts are well known in the art and include numerous organometallic compounds as well as amines, e.g., tertiary amines and metal compounds such as lead octoates, mercuric succinates, stannous octoate or dibutyltin dilaurate may be used. Any catalytic amount may be employed; illustratively, such amount varies, depending on the particular catalyst utilized, from about 0.01 to about 1 percent by weight of the polyurethane prepolymer.

Preferred polyol reactants are the polyether diols and the polyether triols, and combinations thereof. Suitable polyether triols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether triol reactant includes the following and mixtures thereof: the aliphatic triols such as glycerol, propoxylated glycerol adducts, trimethylolpropane, triethylolpropane, trimethylolhexane, and the like.

A preferred group of polyhydric initiators for use in preparing the polyether triol reactant is one which comprises triols such as glycerol, propoxylated glycerol adducts, trimethylolpropane and the like.

The polyether diols are prepared by an analogous reaction of alkylene oxide, or mixture of alkylene oxides with a polyhydric initiator. In this case the initiator is a diol such as ethylene glycol, 1,3-propylene glycol, dipropylene glycol, butylene glycols, butane diols, pentane diols, and the like.

A preferred group of polyhydric initiators for use in preparing the polyether diol reactant is one which comprises diols such as ethylene glycol, diethylene glycols, propylene glycol, dipropylene glycol, or water.

The alkylene oxide-polyhydric initiator condensation reaction is preferably carried out in the presence of a double metal cyanide catalyst. Without wishing to be bound by any particular theory, it is speculated by the present inventor that unsaturated end groups result in monofunctional species that act as chain stoppers in elastomer formation. In polyol synthesis with KOH catalysis the unsaturation formed increases as a direct function of equivalent weight. Eventually conditions are established wherein further propylene oxide addition fails to increase the molecular weight. In other words the use of alkali catalysts to produce high molecular weight, hydroxy terminated polyoxypropylene ethers results in a substantial loss in hydroxy functionality. With double metal cyanide catalysis much less unsaturation is formed allowing higher equivalent weight polyols to be prepared.

The double metal cyanide complex class catalysts suitable for use and their preparation are described in U.S. Pat. Nos. 4,472,560 and 4,477,589 to Shell Chemical Company and U.S. Pat. Nos. 3,941,849; 4,242,490 and 4,335,188 to The General Tire & Rubber Company. The teachings of the foregoing patents are incorporated herein by reference.

One double metal cyanide complex catalyst found particularly suitable for use is a zinc hexacyanometallate of formula:

$Zn_3[M(CN)_6]_2 \cdot xZnCl_2 \cdot yGLYME \cdot zH_2O$ wherein M may be Co(III), or Cr(III) or Fe(II) or Fe(III); x, y, and z may be fractional numbers, integers, or zero and vary depending on the exact method of preparation of the complex.

Any suitable organic polyisocyanate, or mixture of polyisocyanates, may be used in the elastomer-forming process of the present invention. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate (also referred to as diphenylmethane diisocyanate or MDI), xylene diisocyanate (XDI), isophorone diisocyanate (IPDI), 3,3'-bistoluene-4,4'-diisocyanate, hexamethylene diisocyanate (HDI), hydrogenated MDI, hydrogenated XDI, and modified liquid MDI adducts such as carbodiimide-modified MDI, naphthalene-1,5-diisocyanate, the polymeric isocyanates such as polyphenylene polymethylene isocyanate (PMDI), mixtures and derivatives thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20, as well as MDI.

Chain extenders useful in the present invention include diols and diamines such as 4,4'-methylene bis(2-chloroaniline) ("MOCA"), butane diol, hexane diol, propylene glycol, bisphenol A, or polyalkylene oxide polyols with molecular weights between 100–500. The chain extenders can also be triols such as glycerine, trimethylol propane, or propoxylated adducts of glycerine or trimethylol propane or amines like diethyltoluene diamine, ethylene diamine, substituted aromatic diamines such as the product commercially available as UNILINK 4200, a product of UOP, Inc. triisopropyl amine, methylene bis(orthochloro-aniline), N,N-bis(2-hydroxypropyl)-aniline which is commercially available as ISONOL 100, a product of Dow Chemical Corp., and the like, and combinations thereof. Preferred chain extenders include MOCA, butane diol, trimethylol propane, diethyltoluene diamine, N,N-bis(2-hydroxypropyl)-aniline, and combinations thereof. The chain extension can be conducted either in situ during the prepolymer formation or in a separate reaction step.

In preparing the polyurethane and/or polyurea elastomer, the polyether polyol(s), polyisocyanate(s), chain extender(s), and other components are reacted, typically under conditions of an elevated temperature. Urethane forming catalysts can be used as well as antioxidants or other antidegradants. The elastomer-forming components may be mixed with the usual compounding ingredients, e.g. plasticizers, adhesion promoters, fillers and pigments like clay, silica, fumed silica, carbon black, talc, phthalocyanine blue or green, $TiO_2$, U-V absorbers, $MgCO_3$, $CaCO_3$ and the like. The compounding ingredients, such as fillers, are suitably employed in the elastomer in an amount of between 0 and about 75 weight percent based upon the weight of the elastomer. The polymerization reaction may be carried out in a single reaction (one-shot process), or in one or more sequential steps (prepolymer process). In the one-shot process, all the isocyanate-reactive components are reacted simultaneously with the polyisocyanate. In such process, it is normal practice to blend all components except the polyisocyanate into a "B-side" mixture, which is then reacted with the polyisocyanate to form the polyurethane and/or polyurea elastomer. However, the order of mixing is not critical as long as the components do not undesirably react before all components are present. The reaction mixture is usually then placed in a mold and cured at a suitable temperature. The apparatus used for blending and molding is not especially critical. Hand mixing, conventional machine mixing, and the so-called reaction injection molding (RIM) equipment are all suitable. In the prepolymer process, all or a portion of one or more of the isocyanate reactive materials is reacted with a stoichiometric excess of the polyisocyanate to form an isocyanate-terminated prepolymer. This prepolymer is then allowed to react with the remaining isocyanate-reactive materials to prepare the polyurethane and/or polyurea elastomer. The prepolymer can be prepared with either the polyether or the chain extender, or a mixture of both.

As used herein, the term "molecular weight" is intended to designate number average molecular weight.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLE 1

Preparation of Cast Elastomers

A comparison was made between the performance of conventional POLY-G ® polyols and the new POLY-L ™ high molecular weight polyols containing low unsaturation levels in cast elastomers.

The compositions of the polyols that were evaluated in cast elastomers are presented in Table 1. POLY-L polyols were prepared with double metal cyanide catalysts. Note the dramatic difference in the 6200 MW triol (83-26) prepared with KOH (0.095 meq/g unsat., 43 mole % monol, 2.12 functionality) and the 6200 MW triol (X-383-26) prepared with DMC catalyst (0.018 meq/g unsat., 10 mole % monol, 2.77 functionality). The 10,000 molecular weight triols prepared with DMC catalyst (X-385-17 and X-330-18) also had low unsaturation levels and relatively high functionalities compared to the conventional 6200 MW polyol. A comparison of the 4200 MW diols shows a similar dramatic difference. The 4200 MW diol prepared with KOH catalyst (20-28) had an unsaturation value of 0.097 meq/g, 34 mole % monol, and a functionality of 1.66, while the 4200 MW diol prepared with DMC catalyst had an unsaturation value of 0.015 meq/g, 6 mole % monol and a functionality of 1.94. The 10,000 molecular weight diol (X-220-10) had an unsaturation value of 0.020 meq/g and a higher calculated functionality than the conventional 4200 MW diol.

Prepolymer Preparation

The diisocyanate was added to a resin flask under nitrogen and heated to 55C. Polyol was added through a dropping funnel over a period of about 30 minutes. The temperature was raised to 80C and stirred until a constant percent free NCO, as measured by dibutyl amine titration, was obtained (typically 3 hours with MDI and 5 hours with TDI).

Cast Elastomer Preparation

The prepolymer was added to a resin flask, degassed under vacuum, and optionally heated to 60C. The extender was added using a 103 index and the mixture was stirred vigorously and degassed for two minutes. The mixture was poured between glass plates using a ⅛ spacer and cured in an oven at 110° C. for 16 hours.

The elastomers were tested using standard ASTM procedures: Tensile Strength (psi) and Elongation (%) —ASTM D-412; Shore A hardness—ASTM D-2240; Die "C" Tear Strength—ASTM D-624.

TABLE 1

| POLYOL | HYDROXYL NUMBER | UNSAT. meq./g | MOLE % MONOL | WT. % MONOL | FUNCTIONALITY |
|---|---|---|---|---|---|
| Polyol Composition POLY-G ® polyols were prepared with KOH catalyst Poly-L ™ polyols were prepared with double metal cyanide catalysts | | | | | |
| DIOLS | | | | | |
| POLY-G 20-56 | 56.8 | 0.028 | 5.4 | 2.79 | 1.95 |
| POLY-L 220-56 | 58.1 | 0.018 | 3.4 | 1.75 | 1.97 |
| POLY-L 225-48 | 53.4 | 0.017 | 3.5 | 1.81 | 1.96 |
| POLY-G 20-28 | 26.6 | 0.097 | 34.1 | 20.7 | 1.66 |
| POLY-L 20-28 | 26.6 | 0.015 | 6.1 | 3.1 | 1.94 |
| POLY-L 220-14 | 14.4 | 0.018 | 13.2 | 7.2 | 1.87 |
| TRIOLS | | | | | |
| POLY-G 83-26 | 25.5 | 0.092 | 43.1 | 20.9 | 2.12 |
| POLY-L 383-26 | 27.1 | 0.018 | 10.4 | 3.8 | 2.77 |
| POLY-G 85-28 | 26.8 | 0.095 | 40.4 | 19.1 | 2.13 |
| POLY-L 385-17 | 17.4 | 0.017 | 14.6 | 5.6 | 2.68 |
| POLY-L 330-18 | 17.8 | 0.018 | 15.1 | 5.8 | 2.67 |

Hand cast elastomers were prepared from toluene diisocyanate (TDI) prepolymers (6% free NCO) extended with 4,4'-methylene bis(2-chloroaniline) (MOCA). A comparison of the physical properties of the elastomers prepared with the conventional 6000 molecular weight triols to the elastomer prepared with the 6000 molecular weight triol containing a low unsaturation level (Table 2) showed that the lower monol levels resulted in increased tensile strength (2300 vs. 1900 psi). A cast elastomer prepared with a 10,000 molecular weight triol showed even more improvement in tensile strength (2700 vs. 1900 psi), a higher hardness value, and improved elongation.

TABLE 2

Physical Properties of Cast Elastomers
TDI Prepolymers (6% NCO) Extended with MOCA
INDEX 103, CURED AT 110 C.

| POLYOL | | P.P. VISC | SHORE A | TENSILE STR. psi | ELONG. % |
|---|---|---|---|---|---|
| POLY-G | 85-28 | 3900 | 90 | 1910 | 290 |
| POLY-G | 83-26 | 3520 | 90 | 1900 | 300 |
| POLY-L | X-383-26 | 4000 | 90 | 2310 | 260 |
| POLY-L | X-330-18 | 6850 | 92 | 2730 | 390 |

EXAMPLE 2

TDI prepolymers (6% free NCO) prepared with 4200 molecular weight diols were also extended with MOCA to make cast elastomers (Table 3). In this case the effect of the lower monol levels was clearly demonstrated by the fact that the elastomer prepared with the new low unsaturation level polyol had a higher hardness value, significantly higher tensile strength (2400 vs. 1600) and higher tear strength.

TABLE 3

Physical Properties of Hand Cast Elastomers TDI/DIOL Prepolymers (6% NCO) EXTENDED WITH MOCA, 103 INDEX, CURED AT 110 C.

|  | POLYOL | UNSAT. meq/g. | SHORE A | TENSILE STR. psi | ELONG. % | TEAR DIE C |
|---|---|---|---|---|---|---|
| POLY-G | 20-28 | 0.097 | 87 | 1590 | 640 | 475 |
| POLY-L | X-220-28 | 0.015 | 93 | 2420 | 530 | 590 |

EXAMPLE 3

Softer elastomers were prepared from 2.5% NCO TDI prepolymers made with 4200 molecular weight diols extended with MOCA (see Table 4). Once again the low unsaturation level POLY-L polyol produced an elastomer with higher hardness (75 vs. 63 Shore A), higher tensile strength (1180 vs. 890 psi) and a higher tear strength (280 vs. 210 psi).

TABLE 4

Soft Elastomers - 2.5% NCO TDI Prepolymers Extended With MOCA, 103 INDEX, CURED AT 110 C.

|  | SHORE A | TENSILE STR. PSI | ELONG. % | DIE C TEAR |
|---|---|---|---|---|
| POLY-G 20-28 | 63 | 890 | 900 | 210 |
| POLY-L 220-28 | 75 | 1180 | 600 | 280 |

EXAMPLE 4

Soft elastomers were also prepared from 6% NCO TDI prepolymes extended with UNILINK TM 4200, a substituted aromatic diamine product of UOP, Inc. A comparison of an elastomer prepared with a conventional 6000 molecular weight triol to an elastomer prepared with a low unsaturation level 8000 molecular weight triol (Table 5) showed higher hardness value and higher tensile strength value in the elastomer prepared with the low unsaturation level polyol.

TABLE 5

PHYSICAL PROPERTIES OF CAST ELASTOMERS 6% NCO TDI PREPOLYMERS EXTENDED WITH UNILINK 4200

| POLYOL | EXTENDER | SHORE A | TENSILE STR. PSI | ELONG. % |
|---|---|---|---|---|
| POLY-G 85-28 | UNILINK 4200 | 35 | 500 | 550 |
| POLY-L 85-21 | UNILINK 4200 | 40 | 875 | 500 |

EXAMPLE 5

Cast elastomers were prepared with diphenyl methane diisocyanate (MDI) prepolymers made with 6000 and 10,000 molecular weight triols and extended with butane diol (Table 6). Both the low unsaturation 6000 mw triol and the 10,000 triol produced elastomers with higher tensile strength than the conventional 6000 mw triol.

TABLE 6

PHYSICAL PROPERTIES OF MDI CAST ELASTOMERS 9% NCO PREPOLYMERS EXTENDED WITH BUTANE DIOL

| TRIOL | SHORE A | TENSILE | ELONG. |
|---|---|---|---|
| POLY-G 83-26 | 90 | 2150 | 340 |
| POLY-L 383-26 | 90 | 2310 | 260 |
| POLY-L 330-18 | 88 | 2370 | 450 |

EXAMPLE 6

MDI based cast elastomers were prepared with a conventional 4200 mw diol, a low unsaturation level 4200 mw diol, and a low unsaturation level 8000 mw diol (Table 7). The diols were used to prepare 9% NCO MDI prepolymers and the prepolymers were extended with a 70/30 blend of butane diol/ISONOL 100 which is an N,N-bis(2-hydroxypropyl)-aniline product of Dow Chemical Corp. The elastomer prepared with the low unsaturation level 4000 mw diol had significantly higher tensile strength (2250 vs 570 psi), elongation (740 vs 210%), and tear strength (340 vs 120 psi) than the elastomer prepared with the conventional 4200 mw diol. The elastomer prepared with the 8000 mw low unsaturation level diol also had superior properties to the conventional 4200 mw diol though lower than the low unsaturation level 4200 mw diol.

TABLE 7

PHYSICAL PROPERTIES OF CAST ELASTOMERS 9% NCO MCI PREPOLYMERS EXTENDED WITH BDO/1100 70/30

| POLYOL | SHORE A | TENSILE STR. PSI | ELONG. % | DIE C TEAR |
|---|---|---|---|---|
| POLY-G 20-28 | 85 | 570 | 210 | 120 |
| POLY-L 220-28 | 83 | 2250 | 740 | 340 |
| POLY-L 220-14 | 85 | 1590 | 650 | 280 |

EXAMPLE 7

MDI prepolymers were prepared with a low unsaturation level 2000 molecular weight diol and a conventional 2000 mw diol. The prepolymers were extended with butane diol and cured at 110° C. both with and without catalyst. In both cases the elastomers prepared with the low unsaturation level 2000 molecular weight diol had higher tensile strength and higher tear strength although the difference was less dramatic than with the higher molecular weight diols and triols. With the lower molecular weight diols there is a smaller difference in the functionality and unsaturation level values between the KOH and the double metal cyanide catalyzed polyol (see Table 8).

TABLE 8
PHYSICAL PROPERTIES OF CAST ELASTOMERS
9% NCO MCI PREPOLYMERS EXTENDED WITH BDO

| DIOL | SHORE A | TENSILE STR. | ELONG. % | DIE C TEAR |
|---|---|---|---|---|
| NO CATALYST, CURED 110 C., 16 H | | | | |
| POLY-G 20-56 | 89 | 2970 | 660 | 500 |
| POLY-L 220-56 | 89 | 3180 | 650 | 560 |
| COCURE 44 CATALYST, CURED 110 C., 16 H | | | | |
| POLY-G 20-56 | 90 | 2700 | 625 | 490 |
| POLY-L 220-56 | 90 | 2750 | 550 | 590 |

What is claimed is:

1. A thermoset polyurethane or polyurea elastomer made by reacting an isocyanate-terminated prepolymer with a chain-extender other than ethylene glycol, the isocyanate-terminated prepolymer being the reaction product of a polyisocyanate and a polyether polyol prepared utilizing a double metal cyanide complex catalyst and having a molecular weight of between about 400 and about 15,000, said polyol having an end group unsaturation level of no greater than 0.04 milliequivalents per gram of polyol, the equivalent ratio of NCO groups on said polyisocyanate to active hydrogen groups on said polyol plus chain extender being between about 1:0.7 and about 1:1.3, and the molar ratio of chain extender to polyol being between about 0.15:1 and about 1.3:1.

2. The elastomer of claim 1 wherein said chain extender is selected from the group consisting of diols, triols and diamines, and combinations thereof.

3. The elastomer of claim 1 wherein said chain extender is selected from the group consisting of 4,4'-methylene bis(2-chloroaniline) ("MOCA"), butane diol, hexane diol, propylene glycol, bisphenol A, polyalkylene oxide polyols with molecular weights between 100–500, glycerine, trimethylol propane, propoxylated adducts of glycerine or trimethylol propane diethyltoluene diamine, ethylene diamine, triisopropyl amine, N,N-bis(2-hydroxypropyl)-aniline, and combinations thereof.

4. The elastomer of claim 1 which additionally contains at least one compounding ingredient.

5. The elastomer of claim 4 wherein said compounding ingredient is selected from the group consisting of plasticizers, uv stabilizers, adhesion promoters, fillers and pigments.

6. The elastomer of claim 4 wherein said compounding ingredient is employed in an amount of between 0 and about 75 weight percent based upon the total weight of the composition.

7. A thermoset polyurethane or polyurea elastomer made by reacting in a "one-shot" process a polyether polyol, a polyisocyanate, and a chain-extender other than ethylene glycol, the polyether polyol being prepared utilizing a double metal cyanide complex catalyst and having a molecular weight of between about 400 and about 15,000, said polyol having an end group unsaturation level of no greater than 0.04 milliequivalents per gram of polyol, the equivalent ratio of NCO groups on said polyisocyanate to active hydrogen groups on said polyol plus chain extender being between about 1:0.7 and about 1:1.3, and the molar ratio of chain extender to polyol being between about 0.15:1 and about 1.3:1.

8. The elastomer of claim 7 wherein said chain extender is selected from the group consisting of diols, triols and diamines, and combinations thereof.

9. The elastomer of claim 7 wherein said chain extender is selected from the group consisting of 4,4'-methylene bis(2-chloroaniline) ("MOCA"), butane diol, hexane diol, propylene glycol, bisphenol A, polyalkylene oxide polyols with molecular weights between 100–500, glycerine, trimethylol propane, propoxylated adducts of glycerine or trimethylol propane diethyltoluene diamine, ethylene diamine, triisopropyl amine, N,N-bis(2-hydroxypropyl)-aniline, and combinations thereof.

10. The elastomer of claim 7 which additionally contains at least one compounding ingredient.

11. The elastomer of claim 10 wherein said compounding ingredient is selected from the group consisting of plasticizers, uv stabilizers, adhesion promoters, fillers and pigments.

12. The elastomer of claim 10 wherein said compounding ingredient is employed in an amount of between 0 and about 75 weight percent based upon the total weight of the composition.

13. A method of fabricating a cast elastomer which comprises the steps of:
    (a) fabricating a polyol having a molecular weight of between about 400 and about 15,000 and having a level of end group unsaturation of no greater than 0.04 milliequivalents per gram of polyol, said polyol being fabricated in the presence of a double metal cyanide catalyst,
    (b) reacting said polyol with a polyisocyanate to produce an isocyanate-terminated prepolymer, and
    (c) reacting said isocyanate-terminated prepolymer with a chain extender other than ethylene glycol in a mold in order to produce a cast elastomer.

14. The method of claim 13 wherein said chain extender is selected from the group consisting of diols, triols and diamines, and combinations thereof.

15. The method of claim 13 wherein said chain extender is selected from the group consisting of 4,4'-methylene bis(2-chloroaniline) ("MOCA"), butane diol, hexane diol, propylene glycol, bisphenol A, polyalkylene oxide polyols with molecular weights between 100–500, glycerine, trimethylol propane, propoxylated adducts of glycerine or trimethylol propane diethyltoluene diamine, ethylene diamine, triisopropyl amine, N,N-bis(2-hydroxypropyl)-aniline, and combinations thereof.

16. The method of claim 13 which additionally contains at least one compounding ingredient.

17. The method of claim 16 wherein said compounding ingredient is selected from the group consisting of plasticizers, uv stabilizers, adhesion promoters, fillers and pigments.

18. The method of claim 16 wherein said compounding ingredient is employed in an amount of between 0 and about 75 weight percent based upon the total weight of the composition.

19. A thermoset polyurethane or polyurea elastomer made by reacting an isocyanate-terminated prepolymer with an ethylene glycol chain extender, the isocyanate-terminated prepolymer being the reaction product of an MDI polyisocyanate and a polyether polyol prepared utilizing a double metal cyanide complex catalyst and having a molecular weight of between about 400 and about 15,000, said polyol having an end group unsaturation level of no greater than 0.04 milliequivalents per gram of polyol, the equivalent ratio of NCO groups on said polyisocyanate to active hydrogen groups on said polyol plus chain extender being between about 1:0.7 and about 1:1.3, and the molar ratio of chain extender to polyol being between about 0.15:1 and about 1.3:1.

20. A thermoset polyurethane or polyurea elastomer made by reacting in a "one-shot" process a polyether polyol, an MDI polyisocyanate, and an ethylene glycol chain extender, the polyether polyol being prepared utilizing a double metal cyanide complex catalyst and having a molecular weight of between about 400 and about 15,000, said polyol having an end group unsaturation level of no greater than 0.04 milliequivalents per gram of polyol, the equivalent ratio of NCO groups on said polyisocyanate to active hydrogen groups on said polyol plus chain extender being between about 1:0.7 and about 1:1.3, and the molar ratio of chain extender to polyol being between about 0.15:1 and about 1.3:1.

* * * * *